United States Patent [19]

Gembinski et al.

[11] Patent Number: 4,784,911

[45] Date of Patent: Nov. 15, 1988

[54] THREE-DIMENSIONAL MULTI-COLOR PLASTIC PARTS AND METHOD OF MAKING SAME

[75] Inventors: John C. Gembinski, Dover; Robert A. Grimmer, Rollinsford; Patricia A. Betzig, Dover, all of N.H.

[73] Assignee: Ex-Cell-O Corporation, Walled Lake, Mich.

[21] Appl. No.: 885,884

[22] Filed: Jul. 15, 1986

Related U.S. Application Data

[63] Continuation of Ser. No. 653,279, Sep. 24, 1984, abandoned.

[51] Int. Cl.[4] ............................................. B32B 27/08
[52] U.S. Cl. ................................... 428/402; 427/180; 427/195
[58] Field of Search ...................... 264/243; 428/402

[56] References Cited

U.S. PATENT DOCUMENTS 3,479,501  1/1969  Pisciotta et al. ...................... 156/63
3,793,418  2/1974  Mori ................................... 264/245

FOREIGN PATENT DOCUMENTS 1383602  2/1975  United Kingdom ................ 264/245

Primary Examiner—Jacob Ziegler
Attorney, Agent, or Firm—John C. Evans

[57] ABSTRACT

Three-dimensional multi-colored plastic parts and a method for manufacturing such parts for automobile interior trim door panels, consoles and instrument panels and the like includes dry cast thermoplastic powder sized in the range of 60-400 microns and with two or more colors of particles mixed for distribution onto a heated mold section with the mixed powder particles being heated to randomly flow at particle margins to form two or more shade tones in a resultant three-dimensional multi-colored textured part of fuzed material.

2 Claims, 2 Drawing Sheets

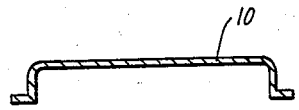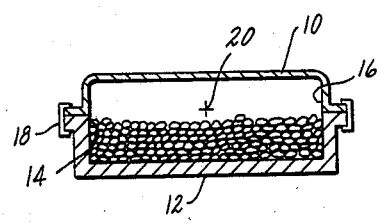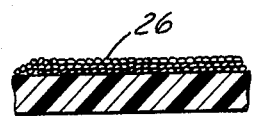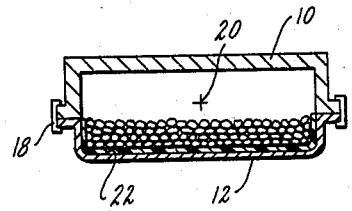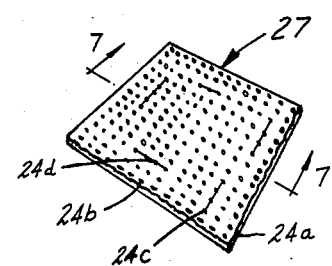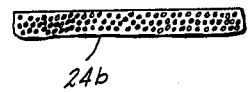

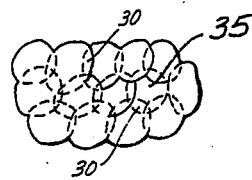
FIG. 8
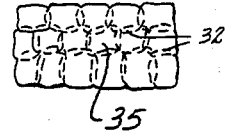
FIG. 8A
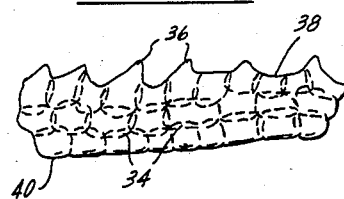
FIG. 8B
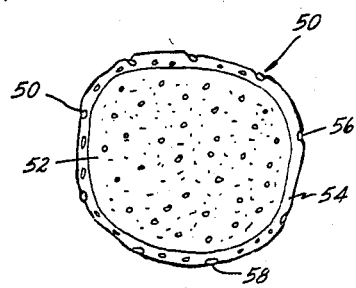
FIG. 9
FIG. 10
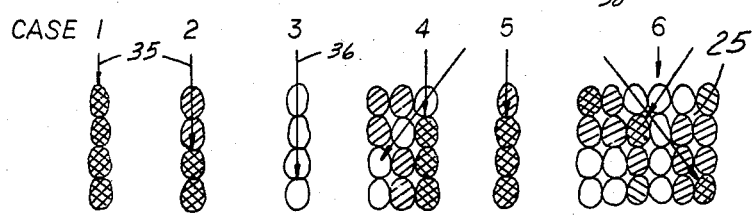
CASE 1  2  3  4  5  6
FIG. 10A
OPAQUE PIGMENT
TRANSLUCENT PIGMENT
TRANSPARENT PIGMENT

THREE-DIMENSIONAL MULTI-COLOR PLASTIC PARTS AND METHOD OF MAKING SAME

This application is a continuation of application Ser. No. 653,279 filed Sept. 24, 1984 now abandoned.

TECHNICAL FIELD

This invention pertains to an improved multi-colored plastic shell especially suitable for use in automobile trim components, computer housings, furniture and, more particularly, to three-dimensional multi-colored plastic shells and method for processing plastic powder to form such articles to have a three-dimensional multi-colored effect.

BACKGROUND ART

The automotive industry has turned to the use of interior trim components such as door panels comprising a polyvinyl chloride part. See, for example, the trim components disclosed in U.S. Pat. No. 3,123,403. The acceptance of such components has been because inter alia this type of construction permits a wide latitude in styling and color, and grain effects which are most desired, particularly in the interior design of automobiles.

The current state of the art includes a pre-formed grained vinyl shell made from dry thermoplastic powder particles which are applied to a heated shell mold from a distribution means to form a continuous monochromatic one-piece shell.

In order to enhance the interior decor of an automobile, interior door panels and other parts have been prepared which include two separate plastic shell sections formed from different colored plastic joined at a connection joint.

The use of multi-colored plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

Multiple-colored thermoplastic floor materials and a method of making same are set forth in U.S. Pat. No. 3,383,442 issued May 14, 1968. Plastic ornaments are made from plastic pellets of different color by methods set forth in U.S. Pat. No. 4,275,028 issued June 23, 1981.

The aforesaid products and methods for manufacture of such products are not directed to a product or process for manufacturing a three-dimensional multi-colored plastic part.

STATEMENT OF INVENTION AND ADVANTAGES

In accordance with the present invention, a threedimensional multi-colored part of thermoplastic powder material includes a thin layer of several pigmented particles of two or more colors with a pre-selected contrasting color ratio, fringe zone blending and particle translucence that produces a three-dimensional, thread like, textile, suede or other effect at the surface of the part. The part is made by mixing two or more quantities of thermoplastic particles, each pigmented with a different color. The mixed particles are cast on a heated textured mold to produce material flow that causes color-blended fused fringe zones of the particles followed by a cooling step to produce a part of two or more color tones simulating textile, suede or other textures in a plastic part.

An open-ended charge box means is filled with a predetermined quantity of different color powder particles having a predetermined color ratio. The loaded, open-ended charge box means is clamped to an open-ended mold to form a closed system. The closed system is rotated so that the charge box releases the multi-colored thermoplastic powder particles to flow evenly across the open end of the mold by gravity to be cast against heated surfaces of the mold; the cast particles are melted on the heated surface to form layers of individual particles of different pigmentation with particle fringe zone blending. The particles are then fused to form stacked, heat flowed, fringe-blended, particles with a predetermined translucence to simulate a textile, suede or other appearance.

The method for forming cloth-simulated material from thermoplastic powder material includes mixing two or more colors of pigmented particles of a contrasting color ratio; casting the particles on a heated mold to form a thin wall plastic part of stacked, heat-flowed, fringe-blended particles and returning excess powder material from the mold into the powder box; and uniformly fusing the plastic particles to form a plastic part which simulates cloth.

In another method a cloth textured mold surface is used to further enhance the cloth simulation.

The molded part of the invention is a single-piece plastic part formed from cast thermoplastic powder particles of two or more pigments joined or fused at particle fringe zones and with reflective properties and a selective translucence layered to produce a three-dimensional multicolored effect, simulating textile, or cloth constructed of colored thread material.

In one combination, a variety of colored particles of polyvinylchloride (PVC) vinyl and cloth texturing grooves on an electroform mold are used to produce an appearance in a cast vinyl part which simulates the appearance of a textile. Because of the variety of color particles, 1, 2, 3, 4 or more, a non-uniform, non-solid appearance, is given to the solid sheet or shell of cast vinyl. The color particles can be blended in any ratio or color combination desired. The textile texture on the electroform as well is not limited, except for the concept of patterning to duplicate the textile. In general, the particles are uniformly mixed. In the cast part, the colors do not blend totally, but keep their discreteness. To the observer, the particles give the appearance of cloth, especially because of their random tendency to line up along a single line or thread of the mold groove in a single color. This thread-like burst of a single color gives the solid plastic its textile-like appearance. The simulated textile colors are especially like the appearance of wool or tweed. Particles of a smaller size present to the naked eye a uniform blend effect. Particles of a larger size tend to produce a spotty effect.

Other advantages and a more complete understanding of the invention will be apparent to those skilled in the art from the succeeding detailed description of the invention and the accompanying drawings thereof.

BRIEF DESCRIPTION OF THE DRAWINGS

FIG. 1 is a diagrammatically shown sectional view of a mold component of the inventive apparatus;

FIG. 2 is a diagrammatically shown sectional view of a powder box of the invention sealed to the mold of FIG. 1 in a pre-dump position;

FIG. 3 is a sectional view like FIG. 2 showing the powder box and mold in a powder dump application orientation;

FIG. 4 is a fragmentary, enlarged sectional view of a textured electroform having the stacked, flowed and color fringe-blended/fused particles of a three-dimensional multi-color plastic part of the present invention cast thereon;

FIG. 5 is a fragmentary, enlarged sectional view of a smooth surface electroform or other mold having the stacked, flowed and color-blended fused fringe zone particles of a three-dimensional multi-colored plastic part of the present ivention cast thereon;

FIG. 6 is a fragmentary, enlarged plan view of the plastic part showing the random line effect produced by the particles in the three-dimensional multi-colored plastic part formed on the mold surface of FIG. 4; and FIG. 7 is a cross-sectional view taken along the line 7—7 of FIG. 6.

FIG. 8 is an enlarged cross-sectional and top view of FIG. 7; FIG. 8A and FIG. 8B are side views, all showing the observed three-dimensional multi-colors due to particle transparency.

FIG. 9 is an enlargement of the pigmented particle cross-section.

FIGS. 10 and 10A show particles of various colors and transparencies and their relevant light transmission effects.

DETAILED DESCRIPTION OF THE INVENTION

The process and article of the present invention will be with reference to the production of plastic thin-walled shells for a typical automotive part such as an interior door panel, consoles and instrument panels. The term "three-dimensional multi-colored plastic part", for purposes of the specification, is defined as a part formed of stacked, thermoplastic particles of controlled size and contrasting color ratio of different pigmentation to simulate a textile constructed from threads/yarns of varying color.

The term textile shall be used in its broadest sense to be synonymous with the terms fabric and cloth. Textile shall be defined as anything made from fibers, threads, or yarns or raw materials that have been woven, knitted, plaited, braided, felted, non-woven, needled, sprayed, spun-bonded or entangled.

The term "pigmented particle" shall mean a small diameter (in the order of 60 to 400 microns) particle of thermoplastic material.

Referring to FIGS. 1-3, a powder molding process line is schematically shown as including selectively heated mold 10. A powder box 12 is operated between raised and lowered positions with respect to the mold 10 by suitable handling equipment, one type of which is specifically set forth in co-pending U.S. Ser. No. 500,760 filed June 3, 1983 for Mold Loading Method and Apparatus.

The box 12 further includes an upper open end 14 which is configured to cover the planar extent of an opening 16 to mold 10.

Clamp means 18 join and seal the powder charge box 12 to mold 10 when the box 12 is elevated to the position shown in FIG. 2, hereinafter referred to as the "mold-up" position.

As a result, the interior of box 12 and the interior of mold 10 form a closed system having a charge of thermoplastic material in the box 12.

In accordance with the present invention, the box contains a charge of pigmented particles of a different color and mixed to produce a contrasting color ratio.

The next process step includes concurrent rotation of the closed system about axis 20 defined by trunnions means of the type set forth in co-pending U.S. Ser. No. 500,760 through 360° relative to the FIG. 2 position.

At FIG. 3, a casting step of the process takes place wherein pigmented particles are distributed evenly throughout the mold opening 16. A resultant even layered build-up of plastic powder occurs on pre-heated surface 22 of the mold 10. The inverted mold position shown in FIG. 3 will hereinafter be referred to as the "mold-down" position.

Following the fill step, the joined mold 10 and charge box 12 are rotated 180° so that the mold 10 is located vertically above the box 12 in the mold-up position.

An air-jet system of the type shown in the co-pending U.S. Ser. No. 500,760 may be used to dislodge excess powder from the walls of the mold so that the dislodged material will flow by gravity return to the interior of the box for collection and reuse in the system.

Additional processes such as fluidized bed, power spray, impeller shower, electrostatics and air blow can be used to coat the mold with pigmented particles.

A powder fuse cycle is then carried out in accordance with known practice wherein the cast pigmented particles are completely fused into a thin-walled part. Before the fuse cycle, the charge box is unclamped from the inverted mold 10 and the box 12 is returned to a powder make-up position. Thereafter the mold 10 (with the powder cast to the surface) is heated further to fuse the powder, then is cooled and rotated into a strip position corresponding to the mold-down position.

Once the pigmented particles are cast and adhered to the heated mold surface the system is rotated back to the position shown in FIG. 2. Excess powder returns and the powder box is removed. The mold 10 remains in its mold-up position during a cure stage. Make-up pigmented particles of appropriate contrasting color ratio are directed to the box 12 prior to the next operating cycle.

The pigmented particles are thermoplastic. The mixture of pigmented thermoplastic particles used in the process must be fused to produce the finished plastic part. Prior to the fusion, the heated mold will cause each layered pigmented particle to enter a gel or liquidus stage so that each pigmented particle flows to form a fringe zone which color blends with adjacent particles. Prior to the gel stage the particles abut at point contacts to form voids between the particles as shown at reference numeral 25 in FIGS. 2 and 3. A diagrammatic representation of a void 25 is also designated in case 6 of FIG. 10. The gel and fusion of the particles produce fused fringe zones 30 and fused fringe zones 32, 34. The resultant product is shown in FIGS. 8, 8A and 8B as a solid layer of material without voids. The fused fringe zones 30, 32 and 34 bound a discrete core 35 in each of the individual particles 50. Such discrete cores have desired contrasting characteristics because each pigmented particle maintains its central or original color concentration.

The fringe zone color blended/fused effect results in a surface appearance of a textile texture and avoids a spotted appearance.

The pigmented particles of different color have a predetermined color ratio, the purpose of which is to establish a resultant color effect based on the selected ratios of initial colors of pigmented particles.

As shown in FIGS. 4 and 5, the pigmented particles are either cast on a heated mold with a textured surface 24 which has patterns formed thereon or on a smooth surface 26 any other texture such as leather grain. In both cases the fusion produces a resultant solid part 27 as shown in FIGS. 6 and 7.

Color designing three-dimensional multi-colored plastic parts involves establishing a balance between the primary solid color and the remaining minor colors. One selection of pigmented particles was compounded of: 60% dark blue, 20% light blue and 20% intense yellow. A dark blue colored background might be expected, but the sample resulted in an overall green background appearance. Under 3D microscope magnification at 10-40× power, it is apparent that the green coloring is produced by discrete translucent yellow particles randomly positioned above blue particles to give a green effect. Photo micrographs at 128× show the stacked particles in cross section somewhat as shown in FIGS. 8A and 8B.

Example three-dimensional multi-colored mixtures by weight are:
Blue: 72% dark blue, 18% white, 10% black
Camel: 80% camel, 10% red, 10% black
Red: 80% red, 10% yellow, 10% black When these mixtures are cast onto cloth-textured molds they simulate a cloth appearance. The blue three-dimensional multi-colored samples resemble a denim fabric, camel three-dimensional multi-colored samples resemble a tweed fabric and the red multi-colored samples resemble a ragg wool. If a primary color is chosen which is very dark, such as brown, then the secondary colors become subtle highlights. The contrast of the secondary colors against the primary color becomes most predominant when a light primary color is chosen.

Adding more grooves to form threads and fibers in the mold pattern produces a better textile effect. The particle size preferably is smaller than the thread size groove width in the surface 24. The particle size does not have to be as small as the fiber size, but in a basket weave pattern it is smaller than the thread pattern groove width in surface 24. In a denim cloth texture plastic part rows of threads rise above the general surface. By random order, reflection, or transparency, particles of the same color appear to align with the raised threads 24a, 24b of many of the ridges on the surface 24 as shown in FIG. 7 at 24c, 24d. The eye is conditioned to expect this observation in cloth and therefore replicates it in three-dimensional multi-colored plastic parts formed by the present invention.

The number of colors of pigmented particles in the mixture and the color ratios will vary, dependent upon the effect desired.

Two colors may be used to get three-dimensional multi-colored plastic parts. The translucency of the particles gives various shades, easily seen under a 3D microscope. Two colors will make three plus shades of the combinations. Three colors are selected to produce more than a common mix of two colors.

In some cases a major background color and a secondary color are combined with a hued color which is a shade variation of the major and secondary colors. The unique three-dimensional multi-colored effect on a thermoplastic part is a function of the following:

1. The varying degrees of light transmittency of individual particles
   (a) from transparent to opaque surface effects as shown in cases 1-3 of FIG. 10 wherein arrow 35 represents a light ray.
   (b) dependent on specific surface pigments for a color; i.e., a red may be either transparent, translucent or opaque.
2. Color-blended fringed fused zones shown at 30, 32 and 34 in FIGS. 8, 8A and 8B have varying degrees of transmittency and color depending on the pigmentation of adjacent particles.
3. The random three-dimensional stacking of varying color and transparency particles which determines how far one is able to see into a surface and what predominant color blends are seen as shown in cases 4-6 of FIG. 10.
4. The particle translucency allows some light to scatter through the peaks 36 of a textured surface 38 of the part thereby adding to the three-dimensional effect and depth of the solid top surface shown in FIG. 8.

FIG. 10 illustrates the full range of light effects to produce the three-dimensional multi-colored effect. FIG. 9 shows an individual particle 50. It includes a porous resin core 52 of 250-350 micron size particles of plasticizer-saturated transparent material. An outer layer of pigment particles 54 includes submicron particles in a liquid carrier (dried). Some of the pigment is absorbed as a die or stain in the layer 54. The layer is opaque to transparent. The layer 54 has transparent drying resin particles 56 of submicron size distributed over the outer surface of layer 54. Submicron particles 58 of filler/dryer are also on the surface and tend to be translucent. As can be seen from the cross section of FIG. 9, the layer 54 is formed continuously to cover the outer circumference of core 52.

The size and blending of such pigmented thermoplastic particles against the hot mold surface changes the original particle shape and give a short fissure or thread image. The degree of particle shaping is controlled by process conditions. The exposed particles on the back side of the part are much more defined than those against the grained surface of the mold. The fused particles are generally more transparent on the mold side than on the open air side. The eye may be registering discrete particles as fibers.

A particle size of 180 microns is similar to a thread diameter of 0.007 inches. A mold may be textured to simulate a textile constructed in a left-hand twill of thread count 60-75 warp ends per inch and 35-45 filling picks per inch of thread diameter of 0.007 inches. When a 72% dark blue, 18% white, 10% black compound of pigmented particles is cast on the mold, a sample results which simulates a "denim" texture, recognized by an intricate, intrinsic design simulating closely interwoven elements resembling the structure formed by the threads of a fabric.

In all cases, the color blending effects are integrated throughout the plastic part thickness. This is important in products that have a surface which will experience abrasion with service such as: instrument panels, armrests, window edges, headrests, steering wheel columns, consoles, etc.

Since the three-dimensional multi-colored thermoplastic allows many surface colors on the plastic part, an application of a paint or stain to a textured threedimensional multi-color surface which is then wiped off will simulate cloth and wood textures better than when a solid colored surface is used.

In the three-dimensional multi-colored formula, it may be possible to add a "fabric fragrance" to the compound.

Fused particle shape can be controlled by process parameters such as heat, time and rotation rate. Fused particle shape can be varied from round to elongated to a total blend.

A three-dimensional multi-color plastic part has two effects on textured surfaces: 1) on a coarse texture, where one would expect to have shadows, the texture is enhanced; 2) on shallow textures (little shadowing) the texture is subdued and less apparent than if a solid colored pigmented particles were used.

The synergism between three-dimensional multi-colored pigmented particles and the previously described denim texture or other cloth simulated textures appears to reside in part in the psychological recognition process. Two of the most obvious influences on the recognition process are the frequency and recency with which an input has been encountered in the past to replicate prior experiences.

One way in which frequency seems to facilitate recognition is by establishing higher level memory representations that can be matched to the input. The more often a pattern is experienced, the more likely it can be matched as a single unit against a memory representation.

In most cases of recognition, familiarity and identification merge into a single subjective experience. Often recognition is an automatic process but, in some cases, there is a conscious search of memory to generate plausible candidate representations to compare to the perceptual input.

The visual input of blue three-dimensional multicolored pigmented particles cast onto a "denim" texture mold most closely resembles an actual thread-constructed denim fabric.

The Gestalt principles of perception include:
(a) Good continuation: elements that look alike tend to be grouped together, and
(b) Closure: we literally fill in a piece of the representation that is not provided by the sensory input.

These principles may be used to explain the perception that when viewing a sample of three-dimensional multicolored pigmented particles cast onto a mold with a flat-woven texture, we "see" threads of a single color for specific lengths throughout the sample. In reality, the particles are random.

While the invention has been particularly shown and described with respect to preferred embodiments, it will be understood by those skilled in the art that various changes in form and detail may be made without departing from the spirit and scope of the invention.

What is claimed is:

1. In a three-dimensional multi-colored plastic part for vehicular interior or exterior use having fused granular particles formed by casting plastic particles against a heated mold surface for fusing the particles together, the improvement comprising:

two or more types of pigmented granular particles, each of the individual granular particles having a diameter in the range of 300 to 400 microns and incuding a core of porous resin material of 250–350 micron size and an outer layer of submicron pigment particles in a dried liquid carrier which coats said core;

each type of particles having a light transmission which varies from that of the other types of pigmented granular particles;

individual ones of said stacked particles having discrete cores fused to form a solid part, said solid part haing non-patterned, color-blended fused fringe zones formed between each of said discrete cores, said fused fringe zones filling the voids therebetween and said discrete cores retaining the individual light transmission properties of the individual ones of the particles.

2. In the combination of claim 1, a groove pattern formed in the fused stacked particles, said particles having a spherical diameter no greater than the width of any portion of the grooves forming the groove pattern in the fused stacked particles, said grooves having a width and depth which combines with the individual light transmission properties of the individual particles to simulate a three dimensional surface effect with a textile textured surface appearance.

* * * * *